United States Patent
Park et al.

(10) Patent No.: US 6,785,205 B2
(45) Date of Patent: Aug. 31, 2004

(54) APPARATUS FOR CONTROLLING ECCENTRICITY IN PHOTO-RECORD PLAYER AND CONTROL METHOD THEREOF

(75) Inventors: Sang On Park, Kyonggi-do (KR); Yong Cheol Park, Kyonggi-do (KR); Eung Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 09/996,614

(22) Filed: Nov. 30, 2001

(65) Prior Publication Data

US 2002/0064104 A1 May 30, 2002

(30) Foreign Application Priority Data

Nov. 30, 2000 (KR) .......................................... 2000-71990

(51) Int. Cl.[7] ................................................. G11B 7/00
(52) U.S. Cl. ............................... 369/44.32; 369/53.14; 369/53.12
(58) Field of Search ........................... 369/44.27, 44.28, 369/44.29, 44.32, 44.34, 53.1, 53.12, 53.13, 53.14, 53.19

(56) References Cited

U.S. PATENT DOCUMENTS 6,147,944 A * 11/2000 Kwon et al. ............. 369/44.32
6,498,772 B1 * 12/2002 Fujiune et al. ........... 369/44.29

* cited by examiner

*Primary Examiner*—Muhammad Edun
(74) *Attorney, Agent, or Firm*—Birch, Stewart, Kolasch & Birch, LLP (57) ABSTRACT

Disclosed is an apparatus for controlling eccentricity in a photo-record player and a control method thereof. A relative eccentric quantity is found from a TE signal (or, tracking driving voltage) induced per one revolution of disc 'on track' and an eccentricity phase to be controlled is found from a periodicity of TE (or, tracking driving voltage) per one revolution of disc. A suitable compensating value for the relation between the found eccentricity quantity and phase is generated by taking FG representing a period of revolution as a reference. Then, the compensating value is used for an eccentricity control 'on track', or driving the tracking actuator on 'seek'. Therefore, the present invention reduces a seek location error due to the eccentricity on 'seek', thereby enabling to increase a seek performance.

25 Claims, 5 Drawing Sheets

FIG.1

Background Art

APPARATUS FOR CONTROLLING ECCENTRICITY IN PHOTO-RECORD PLAYER AND CONTROL METHOD THEREOF

BACKGROUND OF THE INVENTION

1. Field of the Invention

The present invention relates to a photo-record player, and more particularly, to an apparatus for controlling eccentricity in a photo-record player and a control method thereof which are applicable to normal servo or seek by measuring an eccentricity ratio and an eccentricity phase of a photo-record media.

2. Background of the Related Art

Generally, a photo-record medium, i.e. a photo-disc record player recording and regenerating a photo-disc, plays data recorded in a photo-disc using the photo-disc as a record medium such as CD (compact disc), DVD (digital versatile disc), and the like pr records data in the disc.

In order to find a demanded destination on the photo-disc, a laser beam generated from a pickup is moved to a target track precisely so as to be tracked on the target track, which is called 'seek' or 'search'.

Such a seek operation is carried out in a manner that an entire photo-pickup is moved near a demanded track by driving a sled motor when a count of tracks to be jumped is hundreds to thousand in accordance with the calculation of the count of the tracks to a target track and that the demanded track is found using a tracking actuator if a count of remaining tracks is below several hundreds. In this case, 'jumping tracks by moving the sled motor' is called 'rough seek', while 'jumping tracks by moving the actuator' is called 'fine seek'.

Figure 1:
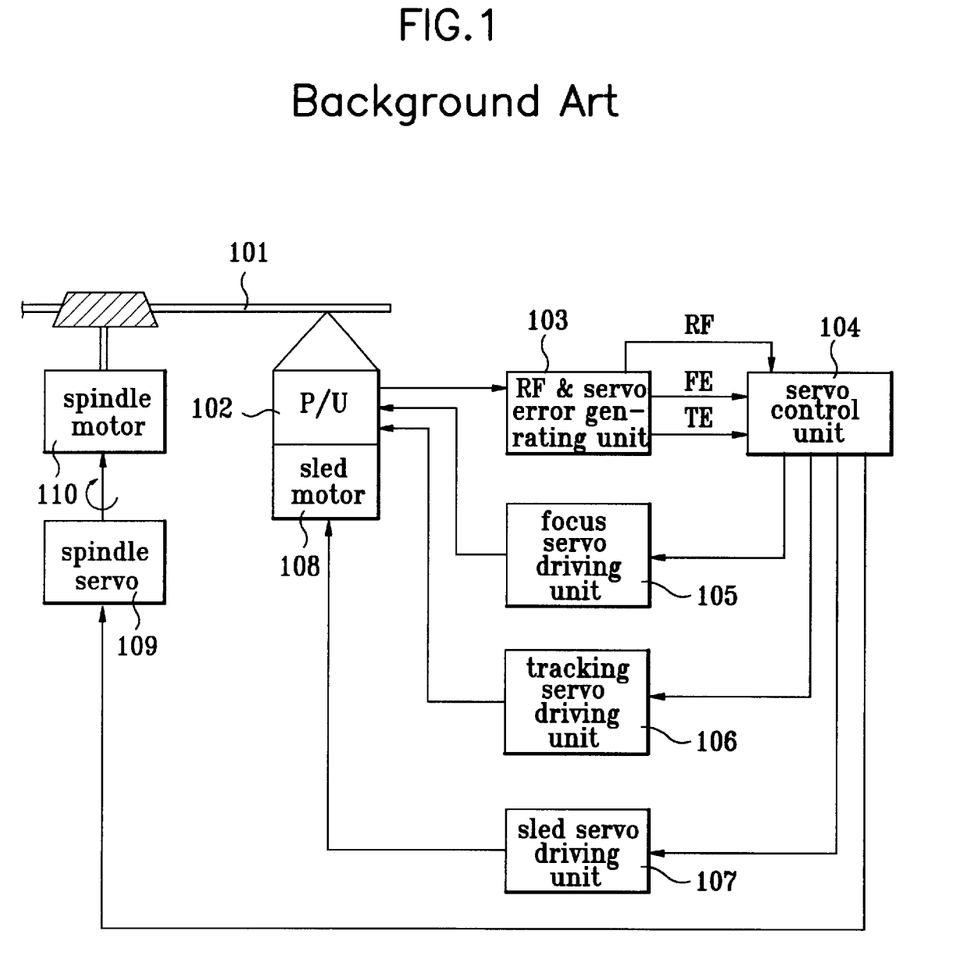
FIG. 1 illustrates a block diagram of a general photo-disc recorder/player.

FIG. 1 illustrates a block diagram of a general photo-disc recorder/player.

Referring to FIG. 1, a photo-pickup 102 makes a light beam, which is focused on a substance lens by a control of a servo control unit 104, placed on a signal track of a photo-disc 101, focuses an incident light reflected on a signal record surface, on the substance lens again, and then makes the light incident to a photo-detector to detect a focus error signal and a tracking error signal.

The photo-detector includes a plurality of photo-detecting devices and outputs electric signals proportional to the light intensity attained by the respective photo-detecting devices to an RF/servo error generating unit 103.

The RF/servo error generating unit 103 detects an RF signal for data regeneration, a focus error signal FE for servo control, and a tracking error signal TE from the electric signals detected from the respective photo-detecting devices.

The detected RF signal is outputted to a data decoder (not shown in the drawing) for play, and servo error signals such as FE and TE are outputted to a servo control unit 104.

The servo control unit 104 carries out a signal processing on the focus error signal FE so as to output a driving signal for a focusing control to a focus servo driving unit 105, and carries out a signal processing on the tracking error signal TE so as to output a driving signal for a tracking control to a tracking servo driving unit 106.

In this case, the focus servo driving unit 105 drives a focus actuator in the photo-pickup 102 in accordance with the focus driving signal to move the photo-pickup 102 up and down so that the photo-disc 101 rotates to follow the up and down movement correspondingly.

The tracking servo driving unit 106 drives a tracking actuator in the photo-pickup 102 in accordance with the focus driving signal so as to amend a location of a beam by moving the substance lens of the photo-pickup in a radial direction, thereby tracking a predetermined track. In this case, on a normal record/play operation or fine seek, the substance lens of the photo-pickup 102 is moved in the radial direction by driving the tracking actuator.

Meanwhile, in 'rough seek' that the photo-pickup is moved entirely, the sled servo driving unit 107 receives a sled control signal from the servo control from the servo control unit 104 so as to transport a body of the photo-pickup 102 directly in a demanded direction by driving the sled motor 108.

Moreover, the servo control unit 104 detects revolution speed information of a disc from the RF signal so as to output the information to a spindle servo 109. The spindle servo 109 then carries out a phase locked loop (PLL) control on a spindle motor 110 in accordance with the revolution speed information so as to revolve the disc 101. Namely, the spindle motor 110 gives a spindle (not shown in the drawing) a turning force for the revolution of the disc 101, and then the spindle transfers the turning force given by the spindle motor 110 to the disc 101, thereby enabling to revolve the disc 101 at a demanded speed.

In this case, the photo-disc 101 may be distorted during projecting and hardening steps of a resin in a manufacturing process. And, the distortion may causes eccentricity despite piercing a hole in a center of the disc. Moreover, tracks of the disc, even if recorded precisely with a spiral figure with pitches of a determined standard, may bring about eccentricity due to deviation of the center hole. As the disc revolves with the eccentricity, a central axis of a motor barely coincides with a center of each of the tracks. Namely, the original disc center fails to coincide with the track center.

Particularly, there are disc eccentricity occurring in manufacturing a disc, eccentricity occurring in mounting the disc, and eccentricity due to 'run-out' of a revolving axis. Besides, the quantity by 'run-out' of a photo-axis is relatively much smaller than a quantity of the eccentricity caused by each of the foregoing two factors.

Thus, it is difficult to precisely read a signal of a demanded track only. Hence, the eccentricity should be controlled. Specifically, if it fails to control the eccentricity, a seek location becomes inaccurate. Inevitably, a destined location is found by carrying out a number of track jumps to 'fine seek. Therefore, a seek time is taken longer.

In a method of controlling eccentricity according to a related art, a quantity of eccentricity is measured when a track control loop is configured and then a control degree (i.e. servo gain) of a track loop is adjusted in accordance with the measured quantity of the eccentricity.

Figure 2:
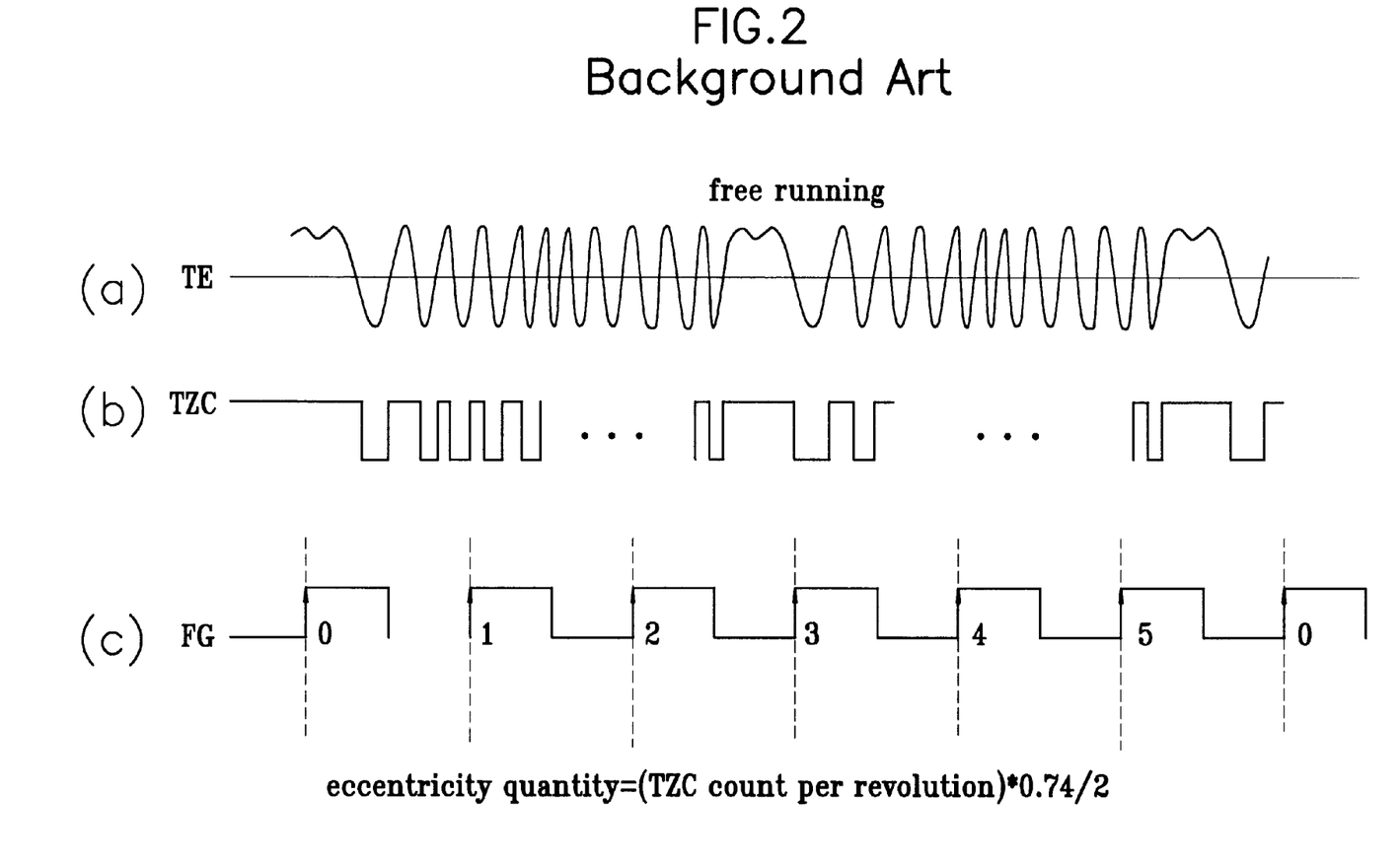
FIG. 2 including (a), (b), and (c) illustrates graphs of waveforms of a TE signal, a track zero crossing (TZC) signal at this time, and an FG signal which are measured on pre-running status.

FIG. 2 including (a), (b), and (c) illustrates graphs of waveforms of a TE signal, a track zero crossing (TZC) signal at this time, and an FG signal which are measured on pre-running status.

The TZC signal in FIG. 2(b) is a signal turned on/off at a track crossing time point, and is attained by slicing the TE signal in FIG. 2(a) into internal reference levels. And, the FG signal in FIG. 2(c) is a frequency generating (FG) signal, in which the frequency is generated from spindle revolution. In this case, a count of FG signals generated from one revolution of the spindle may vary in accordance with designer's choice. In the drawing, it is assumed that a count of the FG signals during one spindle revolution, i.e. one revolution of a photo-disc, as shown in FIG. 2(c), is six.

In this case, when the photo-disc is inserted, a quantity of eccentricity is measured by the following Formula 1 at a pre-running state that a tracking servo and a focus servo are turned off and on, respectively.

[Formula 1]

$$\text{a quantity of eccentricity} = (\text{TZC count per revolution of photo-disc}) \times T_p \times \tfrac{1}{2},$$

where $T_p$ is a track pitch. And, $T_p$ of DVD is 0.74 mm.

Figure 3:
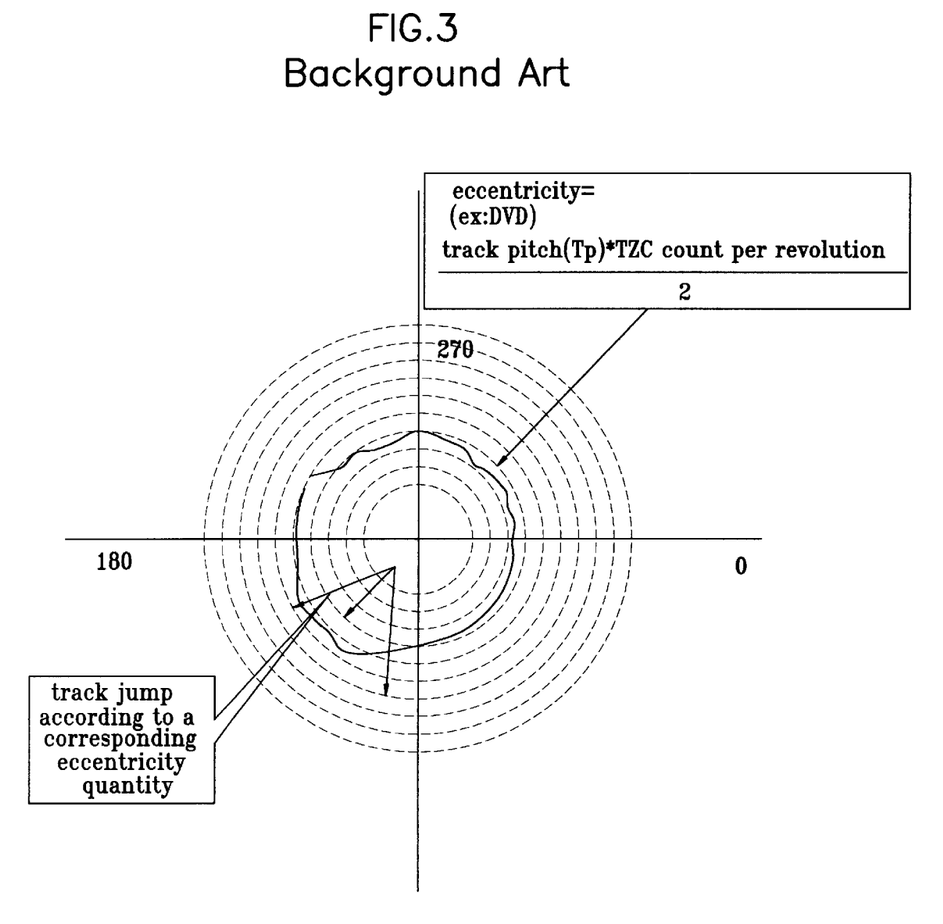
FIG. 3 illustrates a diagram for explaining a track jump in a general photo-disc structure such as DVD and finding a quantity of eccentricity at this time.

FIG. 3 illustrates a diagram for explaining a track jump in a general photo-disc structure such as DVD and finding a quantity of eccentricity at this time.

Namely, an absolute measurement of eccentricity is attained by counting TZC (track zero crossing) signals generated by one spindle revolution during pre-running. The one spindle revolution is known by counting the number of FG signals as shown in FIG. 2(c).

Such a measured quantity of eccentricity is always constant while the disc is loaded.

The above-mentioned method enables a follow-up for a general track control but fails to be applicable to a 'seek' with no track control. Hence, an error of a seek location becomes excessive when eccentricity is large, thereby affecting greatly an access time delay. And, eccentricity fails to be followed up unless a servo tracking gain increases. Then, the RF signal is not properly detected, thereby degrading record/play signals.

Moreover, the quantity of eccentricity attained by the above method is absolute, while a control quantity of each controller is relative. Hence, gain and filter coefficients in the corresponding controller should be changed, whereby a servo becomes unstable and hardware becomes complicated.

SUMMARY OF THE INVENTION

Accordingly, the present invention is directed to an apparatus for controlling eccentricity in a photo-record player and control method thereof that substantially obviates one or more problems due to limitations and disadvantages of the related art.

An object of the present invention is to provide an apparatus for controlling eccentricity in a photo-record player and control method thereof, which detects a quantity and a phase of eccentricity from periodicity of TE generated from one revolution of a disc, determines an eccentricity control quantity using the quantity and phase of eccentricity, and applies the eccentricity control quantity to a normal servo.

Another object of the present invention is to provide an apparatus for controlling eccentricity in a photo-record player and a control method thereof which detects a quantity and a phase of eccentricity from periodicity of TE generated from one revolution of a disc, determines to store an eccentricity control quantity using the quantity and phase of eccentricity, and applies the eccentricity control quantity to a seek.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling eccentricity in a photo-record player measuring to control the eccentricity when a photo-record medium is inserted according to the present invention includes a step (a) of detecting an eccentricity quantity from a size of a tracking error signal generating per one revolution of the photo-record medium after on-track, a step (b) of detecting an eccentricity phase from a periodicity of the tracking error signal generating per one revolution of the photo-record medium, and a step (c) of generating an eccentricity compensating value from the eccentricity quantity of the step (a) and the eccentricity phase of the step (b) so as to compensate a tracking driving voltage driving a tracking actuator.

Preferably, the eccentricity quantity is detected from a peak-to-peak voltage of the tracking error signal in the step (a).

Preferably, the eccentricity phase is detected from a peak-to-peak voltage of the tracking error signal in the step (a).

Preferably, the periodicity of the tracking error signal in the step (b) is verified by a period signal generating regularly with a predetermined time interval when the photo-record medium revolves after the on-track.

Preferably, the period signal is a frequency generating (FG) signal.

Preferably, the eccentricity phase in the step (b) is detected from a phase difference between the FG signal generating per one revolution of the photo-record medium and the tracking error signal occurring simultaneously.

Preferably, the eccentricity phase in the step (b) is detected from a periodicity of the tracking driving voltage generating per one revolution of the photo-record medium.

Preferably, the eccentricity compensating value in the step (c) is generated using the following formula: eccentricity compensating value=$A \sin\{2\pi(mt/(nT)+\phi)$, where A is the eccentricity quantity, $\phi$ is the eccentricity phase, n is a count of FG signals generating per one revolution of the photo-record medium, and m is a location of the FG signal when the size of the tracking error signal is maximum.

Preferably, the tracking driving voltage in the step (c) is generated from a value attained by adding the tracking error signal to the eccentricity compensating value on normal servo.

Preferably, the compensating value in the step (c) is stored therein and then the tracking driving value is generated only from the compensating value having been stored on seek.

In another aspect of the present invention, an apparatus for controlling eccentricity in a photo-record player, the apparatus measuring to control the eccentricity when a photo-record medium is inserted, the apparatus includes an eccentricity detecting unit detecting an eccentricity quantity from a size of a tracking error signal inputted after on-track and detecting an eccentricity phase from a phase difference between the tracking error signal and a period signal generating per one revolution of the photo-record medium with a predetermined interval, a compensating signal generating unit receiving the eccentricity quantity and phase so as to generate to store an eccentricity compensating value, and a servo unit carrying out a tracking servo by compensating a tracking driving voltage with the eccentricity compensating value outputted from the compensating signal generating unit.

Preferably, the eccentricity detecting unit detects the eccentricity quantity from the tracking error signal or a peak-to-peak voltage of the tracking driving voltage.

Preferably, the period signal of the eccentricity detecting unit is a frequency generating (FG) signal.

Preferably, the compensating signal generating unit generates the eccentricity compensating value using the following formula: eccentricity compensating value=A sin{2n(mt/(nT)+φ), where A is the eccentricity quantity, φ is the eccentricity phase, n is a count of FG signals generating per one revolution of the photo-record medium, and m is a location of the FG signal when the size of the tracking error signal is maximum.

Preferably, wherein the servo unit carries out the tracking servo by adding the eccentricity compensating value outputted from the compensating signal generating unit to the inputted tracking error signal on normal servo and by generating the tracking driving voltage with a result of the adding.

Preferably, the servo unit carries out the tracking servo on seek by generating the tracking driving voltage with the compensating value stored in the compensating signal generating unit only.

Preferably, the apparatus further includes a switching unit installed at a front stage of the eccentricity detecting unit so as to interrupt an output of the tracking error signal by being turned off.

In a further aspect of the present invention, a method of controlling eccentricity in a photo-record player measuring to control the eccentricity when a photo-record medium is inserted includes a step (a) of detecting an eccentricity quantity from a peak-to-peak voltage of a tracking error signal induced per one revolution of the photo-record medium after on-track, a step (b) of detecting an eccentricity phase from a periodicity of the tracking error signal generating per one revolution of the photo-record medium, a step (c) of receiving the eccentricity quantity and the eccentricity phase so as to generate to store an eccentricity compensating value, and a step (d) of generating a tracking driving voltage with the stored compensating value only on seek so as to drive a tracking actuator.

Preferably, the periodicity of the tracking error signal in the step (b) is verified by a FG (frequency generating) signal generating per one revolution of the photo-record medium after the on-track.

Preferably, The apparatus of claim 18, wherein the eccentricity compensating value in the step (c) is generated using the following formula: eccentricity compensating value=A sin{2π(mt/(nT)+φ), where A is the eccentricity quantity, φ is the eccentricity phase, n is a count of the FG signals generating per one revolution of the photo-record medium, and m is a location of the FG signal when the size of the tracking error signal is maximum.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 including (a), (b), (c), and (d) illustrates graphs of waveforms of a TE signal, a track zero crossing (TZC) signal at this time, and an FG signal, which are measured on pre-running status, and TE detected on track-on.

DETAILED DESCRIPTION OF THE INVENTION

Reference will now be made in detail to the preferred embodiments of the present invention, examples of which are illustrated in the accompanying drawings.

Figure 4:
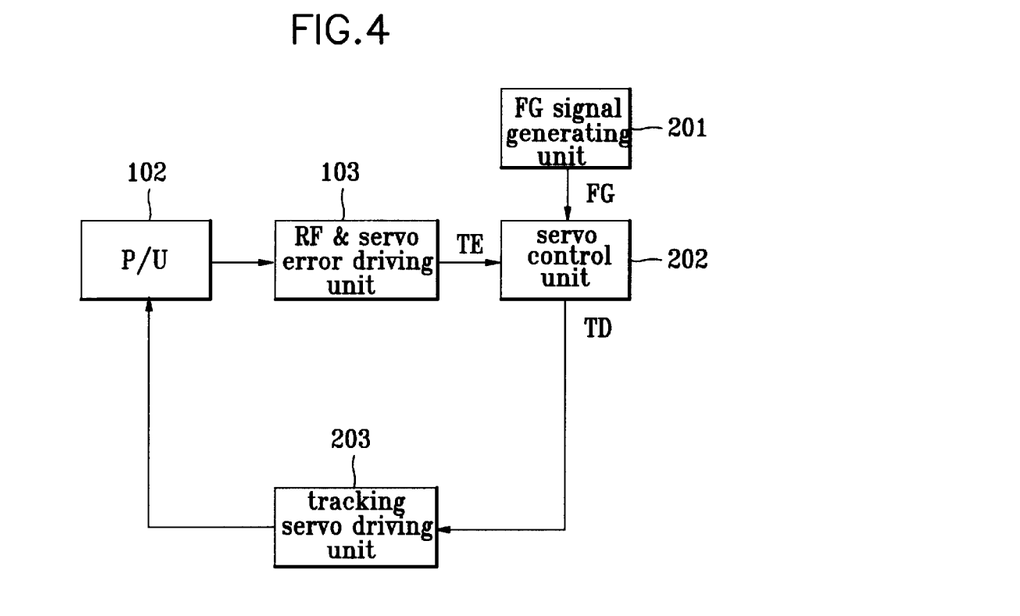
FIG. 4 illustrates a block diagram of a photo-record player for eccentricity control and seek according to the present invention.
Figure 5:
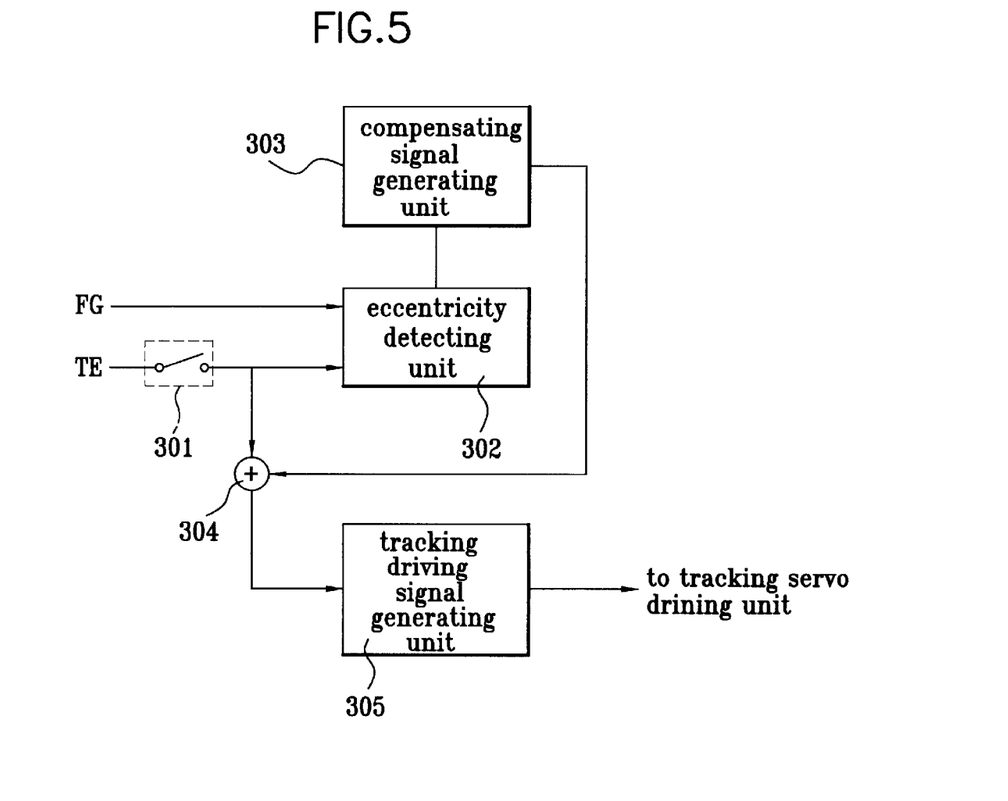
FIG. 5 illustrates a detailed block diagram of units relating to eccentricity control in a servo unit in FIG. 4.

FIG. 4 illustrates a block diagram of a photo-record player for eccentricity control and carrying out a seek using the eccentricity control according to the present invention, and FIG. 5 illustrates a detailed block diagram of units relating to eccentricity control in a servo unit in FIG. 4.

Referring to FIG. 4, a FG signal generating unit 201 generates a FG signal whenever a spindle motor 110 rotates so as to output the FG signal to a servo control unit 202. The servo control unit 202 finds eccentricity of a disc using the FG signal and a TE signal outputted from a servo error generating unit 103 and then compensates a tracking driving signal.

In this case, the eccentricity means an eccentricity quantity and an eccentricity phase. Hence, both of the eccentricity quantity and the eccentricity phase are necessary for measuring the eccentricity.

The servo control unit 202, as shown in FIG. 5, includes a switching unit 301 letting the RF signal and the TE signal generated from the servo error generating unit 103 pass through or interrupting the RF and TE signals by switching, an eccentricity detecting unit 302 detecting the eccentricity quantity and phase of the disc from the TE signal outputted through the switching unit 301 and the FG signal generated from the FG signal generating unit 201, a compensating signal generating unit 303 receiving the eccentricity quantity and phase detected by the eccentricity detecting unit 302 so as generate to store an eccentricity compensating signal, an adder 304 adding the eccentricity compensating signal outputted from the compensating signal generating unit 303 to the TE signal outputted through the switching unit 301 and outputting the added value, and a tracking driving signal generating unit 305 generating a tracking driving signal TD from an output of the adder 304 so as to output the signal TD to the tracking servo driving unit 203.

In this case, the switching unit 301 becomes turned off only on 'seek'. Namely, as a track control is not carried out on 'seek', a tacking actuator is controlled by generating the tracking driving signal only by the eccentricity compensating signal generated with the eccentricity quantity and phase. On the other hand, on 'normal servo', the tracking actuator is controlled by generating the tracking driving signal with a signal attained by adding the TE signal to the eccentricity compensating signal.

For such an operation, when a disc is inserted, the eccentricity detecting unit 302 detects the eccentricity of the inserted disc using the TE signal outputted through the switching unit 301 and the FG signal generated in spindle revolution on a state of 'on-track'.

In this case, the relative eccentricity quantity, which is supposed to be controlled by the tracking driving signal generating unit 303, may be sought from the TE signal (or tracking driving signal) induced from one revolution of the 'on-track' disc. Besides, the controllable eccentricity phase may be sought from a periodicity of the TE signal (or tracking driving signal) per one revolution of the disc. The tracking driving signal, of which purpose is to suppress the TE signal by driving the tracking actuator, is generated to have an inverse phase of the TE signal.

The eccentricity detecting unit 302 outputs the eccentricity quantity and phase sought by such a manner to the compensating signal generating unit 303. the compensating signal generating unit 303 then generates to store the eccentricity compensating signal from the eccentricity quantity and phase as well as outputs the eccentricity compensating signal to the adder 304.

When the switching unit 301 is turned on, the adder 304 adds the TE signal outputted through the switching unit 301 to the eccentricity compensating signal so as to output the added value to the tracking driving signal generating unit 305. When the switching unit 301 is turned off, the adder 304 outputs the eccentricity compensating signal only to the tracking driving signal generating unit 305.

Subsequently, the tracking driving signal generating unit 305 generates the tracking driving signal from the output of the adder 304 so as to output the tracking driving signal to the tracking servo driving unit 203.

In such a process, a change of gain, filter and the like is unnecessary even if the eccentricity varies in accordance with a kind of the disc.

In this case, the compensating signal generating unit 303 generates to store the eccentricity compensating signal, which is used for 'seek'. Namely, on 'seek', the switching unit 301 is turned off so that the tracking driving signal is generated only by the eccentricity compensating signal previously detected and stored. Thus, it is able to drive the tracking actuator with the eccentricity of almost zero on 'seek'. Therefore, it is able to minimize an error of a target location. Namely, a user enables to seek a location without the eccentricity.

Figure 6:
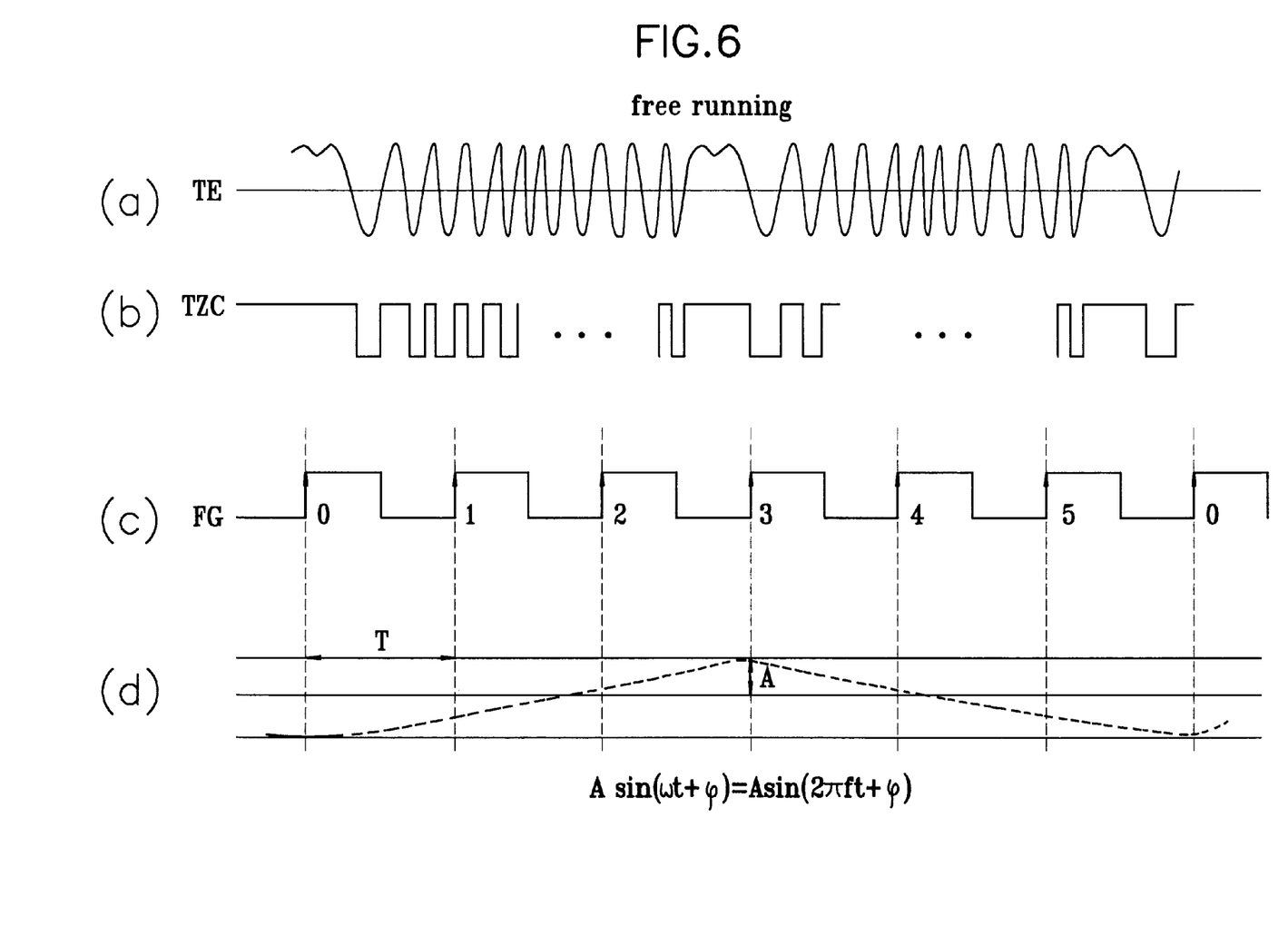

FIG. 6 including (a), (b), (c), and (d) illustrates graphs of waveforms of a TE signal, a track zero crossing (TZC) signal at this time, and an FG signal, which are measured on pre-running status, and TE detected on track-on.

FIG. 6(c) shows an FG signal generated from a spindle revolution. Six FG pulses are generated per one spindle revolution.

FIG. 6(d) shows an example of a tracking error signal when eccentricity exists at a state of 'track-on'. Namely, assuming that a TE signal is generated as in FIG. 6(a) on 'pre-running', the TE signal generated on 'track-on' becomes as shown in FIG. 6(d). Namely, if it fails to follow up the eccentricity, a sinusoidal wave shows up as shown in FIG. 6(d). In this case, a sine eave becomes symmetrical by taking a servo reference signal as a reference.

Namely, a 'run-out' by the eccentricity models a sinusoidal function, as shown in the following Formula 2, of which size is almost constant regardless of time. A period of the sinusoidal function, as shown in FIG. 6(d), coincides with that of the disc. For the convenience of explanation, a location variance by the eccentricity is defined as 'run-out'.

[Formula 2]

$$A \sin(\omega t + \phi) = A \sin(2\pi f t + \phi), \text{ where } f = t/(6T).$$

In the Formula 2, A is an eccentricity quantity, and ϕ is an eccentricity phase. The eccentricity quantity A is attained by finding a peak-to-peak voltage of the sinusoidal wave.

In this case, because it is assumed that six FGs are generated per one revolution of disc, the following Formula 3 is inserted by substituting f=t/(6T) for the Formula 2.

[Formula 3]

$$A \sin\{2\pi t/(6T) + \phi\}$$

In this case, the eccentric quantity in FIG. 6 has a maximum value at FG3, whereby the Formula 3 turns into the following Formula 4.

[Formula 4]

$$A \sin\{2\pi t/(6T) + \phi\} = A, \ t = 3T$$

$$2\pi \times 3T/(6T) + \phi = \pi + \phi = \pi/4$$

$$\phi = (-)3 \ \pi/4$$

Hence, if the eccentricity quantity, A, and the eccentricity phase, −3 π/4, are outputted to the compensating signal generating unit 303, the compensating signal generating unit 303 generates to store an eccentric compensating signal, A sin{2 πt/(6T)−3 π/4}. Then, the eccentric compensating signal, A sin{2 πt/(6T)−3 π/4}, is added to the TE signal inputted through the switching unit 301 in the adder 304 on 'normal servo' so as to be outputted to the tracking driving signal generating unit 305.

On 'seek', the switching unit 301 becomes turned off. Hence, the eccentric compensating signal, A sin{2 πt/(6T)−3 π/4}, stored in the compensating signal generating unit 303 is outputted to the tracking driving signal generating unit 305 through the adder 304 only.

The tracking driving signal generating unit 305 generates a tracking driving signal from a signal outputted from the adder 304 so as to output the tracking driving signal to the tracking servo driving unit 203. The tracking servo driving unit 203 then drives the tracking actuator with the tracking driving signal.

Therefore, a change of gain, filter and the like is unnecessary even if the eccentricity varies in accordance with a kind of the disc. And, it is able to drive the tracking actuator with the eccentricity of almost zero on 'seek'.

As mentioned in the above description of the apparatus for controlling eccentricity in a photo-record player and control method thereof according to the present invention, a relative eccentric quantity is found from a TE signal (or, tracking driving voltage) induced per one revolution of disc 'on track' and an eccentricity phase to be controlled is found from a periodicity of TE (or, tracking driving voltage) per one revolution of disc. A suitable compensating value for the relation between the found eccentricity quantity and phase is generated by taking FG representing a period of revolution as a reference. Then, the compensating value is used for an eccentricity control 'on track', or driving the tracking actuator on 'seek'. Therefore, the present invention reduces a seek location error due to the eccentricity on 'seek', thereby enabling to increase a seek performance.

Moreover, as the found eccentricity quantity is relative, it is unnecessary to change gain, filter, and the like on 'normal servo'by the 'on-track'. Therefore, the present invention enables to simplify hardware thereof.

Furthermore, the present invention makes the servo stable, thereby enabling to improve characteristics of record/play.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of controlling eccentricity of an optical recording medium the method comprising the steps of:
    (a) detecting an eccentricity quantity from a size of a tracking error signal generating per one revolution of the optical recording medium after on-track;
    (b) detecting an eccentricity phase from a periodicity of the tracking error signal generating per one revolution of the optical recording medium; the periodicity of the tracking error signal is verified by a period signal generating regularly with a predetermined time interval when the optical recording medium revolves after the on-track and
    (c) generating an eccentricity compensating value from the eccentricity quantity of step (a) and the eccentricity phase of step (b) so as to compensate a tracking driving voltage driving a tracking actuator.

2. The method of claim 1, wherein the eccentricity quantity is detected from a peak-to-peak voltage of the tracking error signal in step (a).

3. The method of claim 1, wherein the eccentricity phase is detected from a peak-to-peak voltage of the tracking error signal in step (a).

4. The method of claim 1, wherein the period signal is a frequency generating (FG) signal.

5. The method of claim 4, wherein the eccentricity phase in step (b) is detected from a phase difference between the FG signal generating per one revolution of the optical recording medium and the tracking error signal occurring simultaneously.

6. The method of claim 1, wherein the eccentricity phase in step (b) is detected from a periodicity of the tracking driving voltage generating per one revolution of the optical recording medium.

7. The method of claim 1, wherein the eccentricity compensating value in step (c) is generated using the following formula:

$$\text{eccentricity compensating value} = A \sin\{2\pi(mt/(nT)) + \phi\}, \text{ where}$$

A is the eccentricity quantity, $\phi$ is the eccentricity phase, n is a count of FG signals generating per one revolution of the optical recording medium, and m is a location of the FG signal when the size of the tracking error signal is maximum.

8. The method of claim 1, wherein the tracking driving voltage in step (c) is generated from a value attained by adding the tracking error signal to the eccentricity compensating value on normal servo.

9. The method of claim 1, wherein the compensating value in the (c) is stored therein and then the tracking driving value is generated only from the compensating value having been stored on seek.

10. An apparatus for controlling eccentricity of an optical recording medium, the apparatus measuring to control the eccentricity when the optical recording medium is inserted, the apparatus comprising:

an eccentricity detecting unit detecting an eccentricity quantity from a size of a tracking error signal inputted after on-track and detecting an eccentricity phase from a phase difference between the tracking error signal and a period signal generating per one revolution of the optical recording medium with a predetermined interval;

a compensating signal generating unit receiving the eccentricity quantity and phase and generating an eccentricity compensating value from the received eccentricity quantity and phase so as to compensate a tracking driving voltage; and a servo unit carrying out a tracking servo by compensating the tracking driving voltage with the eccentricity compensating value outputted from the compensating signal generating unit.

11. The apparatus of claim 10, wherein the eccentricity detecting unit detects the eccentricity quantity from the tracking error signal or a peak-to-peak voltage of the tracking driving voltage.

12. A The apparatus of claim 10, wherein the period signal of the eccentricity detecting unit is a frequency generating (FG) signal.

13. The apparatus of claim 10, wherein the compensating signal generating unit generates the eccentricity compensating value using the following formula:

$$\text{eccentricity compensating value} = A \sin\{2\pi(mt/(nT)) + \phi\}, \text{ where}$$

A is the eccentricity quantity, $\phi$ is the eccentricity phase, n is a count of FG signals generating per one revolution of the optical recording medium, and m is a location of the FG signal when the size of the tracking error signal is maximum.

14. The apparatus of claim 10, wherein the servo unit carries out the tracking servo by adding the eccentricity compensating value outputted from the compensating signal generating unit to the inputted tracking error signal on normal servo and by generating the tracking driving voltage with a result of the adding.

15. The apparatus of claim 10, wherein the servo unit carries out the tracking servo on seek by generating the tracking driving voltage with the compensating value stored in the compensating signal generating unit only.

16. The apparatus of claim 10, further comprising a switching unit installed at a front stage of the eccentricity detecting unit so as to interrupt an output of the tracking error signal by being turned off.

17. A method of controlling an eccentricity of an optical recording medium, the method comprising:

detecting an eccentricity quantity and an eccentricity phase based on a tracking error signal or a tracking driving voltage generated from the optical recording medium in state of tracking on, the eccentricity phase being detected from a period of the tracking error signal or the tracking driving voltage, the period is verified by a predetermined periodic signal detected during a rotation of the optical recording medium; and generating an eccentricity compensating value from the eccentricity quantity and the eccentricity phase to compensate a tracking driving voltage for driving a tracking actuator.

18. The method of claim 17, wherein the eccentricity quantity is detected from a peak-to-peak voltage of the tracking error signal.

19. The method of claim 17, wherein the eccentricity phase is detected from a peak-to-peak of the tracking error signal.

20. The method of claim 17, wherein the predetermined periodic signal is frequency generating (EG) signal.

21. The method of claim 20, wherein the eccentricity phase is detected from a phase difference between the FG signal generating per one revolution of the optical recording medium and the tracking error signal occurring simultaneously.

22. The method of claim 17, wherein the eccentricity phase is detected from a period of the tracking driving voltage generating per one revolution of the optical recording medium.

23. The method of claim 17, wherein the eccentricity compensating value is generated using the following formula:

$$\text{eccentricity compensating value} = A\sin\{2\pi(mt/(nT)) + \phi\}, \text{ where}$$

A is the eccentricity quantity, $\phi$ is the eccentricity phase, n is a count of FG signals generating per one revolution of the optical recording medium, and m is a location of the EG signal when the size of the tracking error signal is maximum.

24. The method of claim 17, wherein the tracking driving voltage is generated from a value obtained by adding the tracking error signal to the eccentricity compensating value on normal servo.

25. The method of claim 17, wherein the compensating value is stored therein and then the tracking driving value is generated only from the compensating value having been stored on seek operation.

* * * * *